(12) United States Patent
Chien et al.

(10) Patent No.: US 12,504,313 B2
(45) Date of Patent: Dec. 23, 2025

(54) CALIBRATION SYSTEM

(71) Applicant: NATIONAL TAIWAN UNIVERSITY, Taipei (TW)

(72) Inventors: Chen-Ho Chien, Taipei (TW); Li-Hui Hsieh, Taipei (TW); Jen-Jer Jaw, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 282 days.

(21) Appl. No.: 18/217,672

(22) Filed: Jul. 3, 2023

(65) Prior Publication Data

US 2024/0011816 A1 Jan. 11, 2024

(30) Foreign Application Priority Data

Jul. 5, 2022 (TW) .................................. 111125047

(51) Int. Cl.
*G01F 25/20* (2022.01)
*G01W 1/14* (2006.01)

(52) U.S. Cl.
CPC ............... *G01F 25/20* (2022.01); *G01W 1/14* (2013.01)

(58) Field of Classification Search
CPC ............ G01F 25/20; G01F 3/26; G01F 25/10; G01W 1/14; G01W 1/18

USPC ........................ 73/1.01, 1.73, 170.17, 170.18
See application file for complete search history.

(56) References Cited

FOREIGN PATENT DOCUMENTS

| CN | 110568523 A | | 12/2019 | |
|---|---|---|---|---|
| CN | 112114387 A | * | 12/2020 | .............. G01W 1/18 |
| CN | 112835132 A | | 5/2021 | |
| CN | 113740936 A | * | 12/2021 | .............. G01W 1/18 |
| CN | 114325881 A | | 4/2022 | |
| KR | 101385302 B1 | * | 4/2014 | .............. G01W 1/14 |
| WO | WO 2022064084 A1 | | 3/2022 | |

\* cited by examiner

*Primary Examiner* — Robert R Raevis
(74) *Attorney, Agent, or Firm* — Li & Cai Intellectual Property (USA) Office

(57) ABSTRACT

A calibration system is configured to detect a capacity difference of a tipping bucket rain gauge and determine an operational condition of the tipping bucket rain gauge. The calibration system includes a field calibration device, a detection communication box, and an application. The application is executed by an electronic device, which, upon receiving metering information and environmental information transmitted by the detection communication box, can calculate the capacity difference of the tipping bucket rain gauge. The calibration system allows an operator to directly perform testing of the capacity difference and the operational condition of the tipping bucket rain gauge, so as to provide users with follow-up measures or suggestions.

6 Claims, 4 Drawing Sheets

CALIBRATION SYSTEM

CROSS-REFERENCE TO RELATED PATENT APPLICATION

This application claims the benefit of priority to Taiwan Patent Application No. 111125047, filed on Jul. 5, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a specialized calibration system capable of checking the capacity difference and surveyability of a tipping bucket rain gauge in the field (on site) and provide users with suggestions for follow-up procedures.

BACKGROUND OF THE DISCLOSURE

Atmospheric precipitation is a crucial component in the Earth's water cycle, and rainfall data serves as the primary basis for important governmental decisions related to water resource utilization, reservoir operations, and disaster prevention. Currently, a tipping bucket rain gauge (TBRG) is a rainfall observation device that is widely used both domestically and internationally. Like most measuring instruments, the tipping bucket rain gauge requires regular calibration to ensure the accuracy of the measured data, specifically of the rainfall quantity. Therefore, meteorological regulations require that regular calibration of the rain gauge be performed, in accordance with a calibration cycle, for accuracy purposes. In addition to specialized calibration equipment for standard traceability of measurement, trained personnel are also required to perform calibration (which includes detection and adjustment of capacity differences) of the rain gauge. As a result, the rain gauge can only be sent to calibration laboratories for calibration. However, since the calibration capacity of such laboratories is limited, and the rain gauge is typically sent for calibration based on the calibration cycle (around 1 to 3 years), it is often difficult to identify problems in a timely manner.

Furthermore, the rain gauge is exposed to various weather conditions (such as sunlight, wind, and rain) for being typically installed outdoors, and is constantly subject to extreme changes in temperature, humidity, and atmospheric pressure. The rain gauge may also encounter issues caused by external factors, which include dust accumulation, bird droppings, crawling insects, leaves, and the intrusion of animals and plants. Even with regular calibration performed in the laboratory, there is still no guarantee of an operational condition of the rain gauge. Therefore, implementation of effective measures, such as improving on-site inspection procedures for the rain gauge, is both necessary and urgent. A calibration system provided by the present disclosure can provide a feasible, immediate, and effective tool.

A tolerance specified by the meteorological regulations for the rain gauge is currently ±3%. To be more specific, in the commonly observed range of rainfall intensity (which represents rain intensities commonly observed in daily life and ranges approximately from 10 to 100 mm/h or 120 mm/h), the capacity difference RE of the rain gauge (which is typically expressed as a percentage of measurement error) should be within a range of ±3% (i.e., $-3\% \leq RE \leq 3\%$). The capacity difference (RE) is calculated as [(measured value−reference value)/reference value]×100%. The rain gauge needs to satisfy regulatory tolerance requirements for the capacity difference. Moreover, it is essential to assess the performance of the rain gauge in practical applications. This includes verifying instrument usability, such as the stability of a measurement mechanism and the reproducibility of measurement values (i.e., the reliability and validity of the rain gauge).

Currently, the only method for detecting the capacity difference of the rain gauge is to send the rain gauge to the laboratory for periodic calibration. Despite there being products on the global market developed specifically for the tipping bucket rain gauge, such as field calibration devices of YOUNG (USA) and HYQUEST SOLUTIONS (Australia), these devices utilize the traditional method of volumetric burette titration. Such devices have drawbacks of being large in size and inconvenient to transport, having high costs, and having a lengthy testing process. Most importantly, test results of these devices can only provide an approximate capacity difference, and are unable to provide relevant information for instrument testing beyond the capacity difference, thereby failing to meet certain user requirements.

SUMMARY OF THE DISCLOSURE

In response to the above-referenced technical inadequacies, the present disclosure provides a calibration system, which is used to overcome a problem of a conventional detection technology not allowing an operator to directly test a rain gauge on-site.

In order to solve the above-mentioned problems, one of the technical aspects adopted by the present disclosure is to provide a calibration system. The calibration system includes a field calibration device, an application, and a detection communication box. The field calibration device includes a water bottle, a constant head adaptor, and a placement frame. The water bottle is configured to contain water necessary for simulating rainfall. The constant head adaptor is installed at an open end of the water bottle. A needle that is replaceable is disposed at an outlet end of the constant head adaptor. The placement frame is configured to allow the water bottle that is installed with the constant head adaptor to be invertedly disposed inside a collection funnel of a tipping bucket rain gauge to be tested. When the water bottle is filled with the water, the constant head adaptor is installed in the water bottle, and the water bottle and the constant head adaptor are invertedly disposed inside the collection funnel via the placement frame, the water contained in the water bottle is configured to flow out of the needle through the constant head adaptor at a predetermined flow rate and enter the collection funnel of the tipping bucket rain gauge, so as to simulate a condition where the tipping bucket rain gauge is exposed to the rainfall with a predetermined intensity. The application is configured to be executed by an electronic device. The detection communication box includes a measurement sensor module, an environmental condition sensor, a message transmission module, and a power supply module.

The environmental condition sensor is configured to sense at least one environmental parameter of a temperature, a humidity, and an atmospheric pressure of an environment where the detection communication box is located, and to correspondingly generate environmental information (satisfying the requirements of providing detection of the "environmental conditions" as well as calculating "uncertainty" in accordance with testing specifications). The measurement sensor module is configured to correspondingly generate metering information when detecting an automatic tipping action of a plurality of buckets of the tipping bucket rain gauge that are filled with the water up to a nominal volume. The message transmission module is configured to transmit the metering information and the environmental information to the electronic device executing the application. The power supply module is electrically connected to the measurement sensor module, the environmental condition sensor, and the message information transmission module. After the electronic device that executes the application receives the metering information and the environmental information, the application can immediately calculate a capacity difference measured by the tipping bucket rain gauge according to a model and a specification of the tipping bucket rain gauge (i.e., a detection object), the flow rate corresponding to the field calibration device, the metering information, the environmental information, etc. According to preset conditions, the usability of the detection object can be determined, and a suggestion message is correspondingly generated.

Therefore, the calibration system of the present disclosure can provide a practical tool that is convenient, automated, and effective, which allows users (e.g., a frontline rainfall observation personnel or a maintenance vendor) to quickly assess the capacity difference of the tipping bucket rain gauge and verify instrument usability at a field station, and to obtain subsequent handling recommendations.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
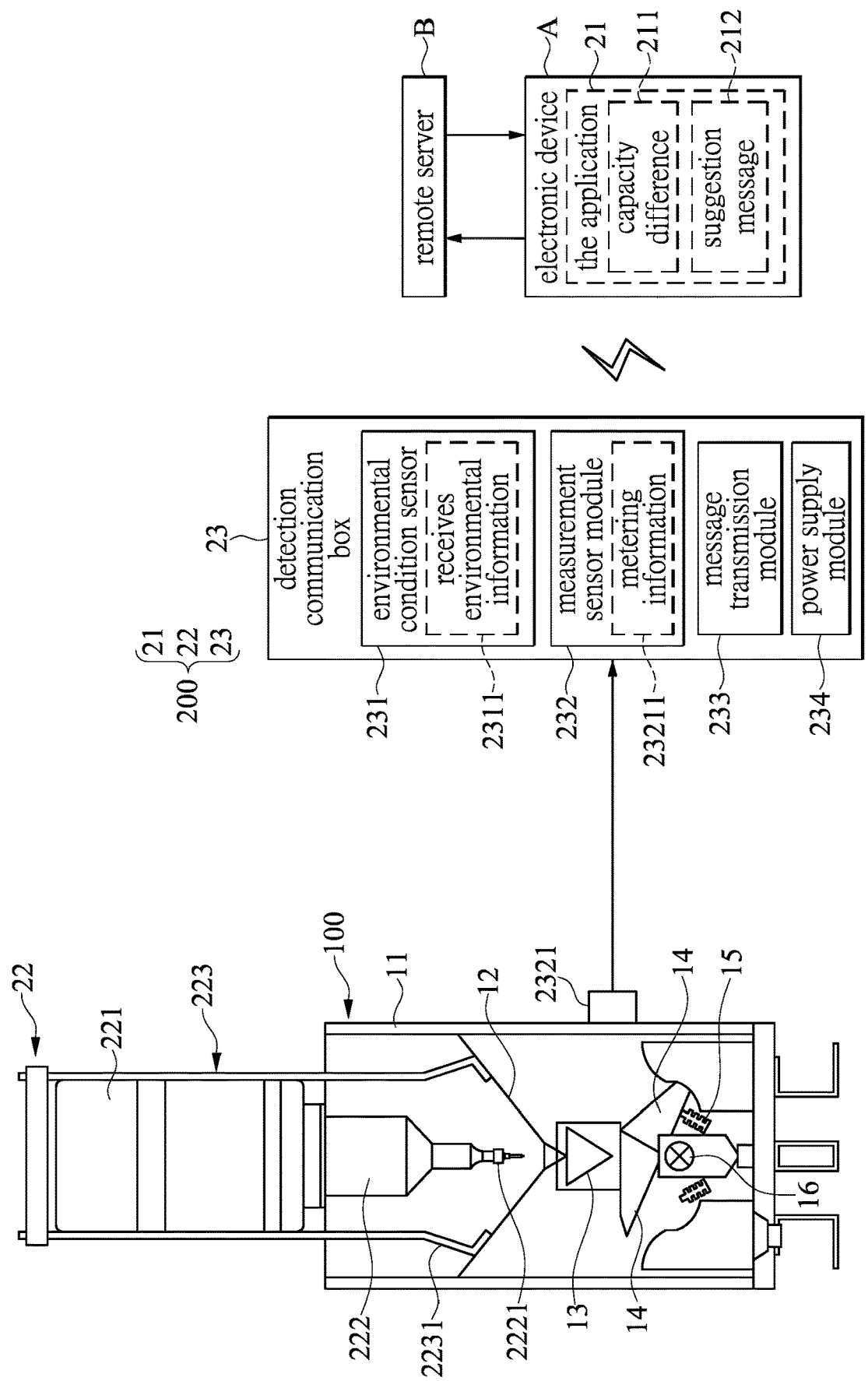
FIG. 1 is a schematic view of a calibration system according to the present disclosure and a typical tipping bucket rain gauge.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In the following description, if it is indicated that "reference is made to a specific figure" or "as shown in a specific figure", this is only to emphasize that in the description that follows, most content related thereto is depicted in said specific figure. However, the description that follows should not be construed as being limited to said specific figure only.

In order to provide a more detailed explanation of the features and technical content of the present disclosure, it is necessary to first provide a detailed description of the unique measurement principle of a tipping bucket rain gauge. Reference can be made to the detailed description and accompanying drawings of the present disclosure as provided below. Moreover, the device constructed in the present disclosure and its utilization of special detection techniques will be further explained. In addition to verifying a capacity difference in rainfall measurement, an operational status of a calibration component can also be determined based on relevant data obtained during a detection process. In the present disclosure, general users can perform on-site calibration of the tipping bucket rain gauge with simple training, and the expected effectiveness and objectives of the detection process can be achieved.

The present disclosure discloses a calibration system that not only provides a convenient tool for automatically detecting the capacity difference of the tipping bucket rain gauge to meet regulatory requirements, but also allows the users to verify an operational condition of an instrument. The calibration system not only ensures the accuracy and the reliability of the rain gauge, but also provides the users with relevant suggestions for subsequent use or handling, so as to meet the practical needs of the instrument in actual use. The calibration system in the present disclosure cannot replace the function of sending the rain gauge for laboratory calibration, but can compensate for the limitation of not being able to promptly detect problems due to periodic calibration. In addition to prioritizing the laboratory calibration for the rain gauge with actual calibration needs, the calibration system can also address the calibration requirements of the typical rain gauge and the issue of insufficient calibration capacity in domestic laboratories.

Traditionally, the rain gauge has used the Buret method for detecting the capacity difference. However, the flow rate static method is a newer and more efficient capacity difference detection method. The calibration system of the present disclosure is developed based on long-term observation and technical experiences of the inventors in a rain gauge calibration laboratory, and based on their understanding of characteristics of the capacity difference of the rain gauge. Since the method can more accurately grasp the characteristics of the capacity difference that changes with the rainfall intensity (referred to as rain intensity), only a set of key rain intensities is needed to achieve the expected purpose of detecting the capacity difference of the tipping bucket rain gauge. The method can not only be used to determine whether or not a measurement error of a detection object meets tolerance requirements (regulations), but also accurately determine the surveyability of the rain gauge from a technical perspective through use of relevant parameters measured during a testing process.

Figure 2:
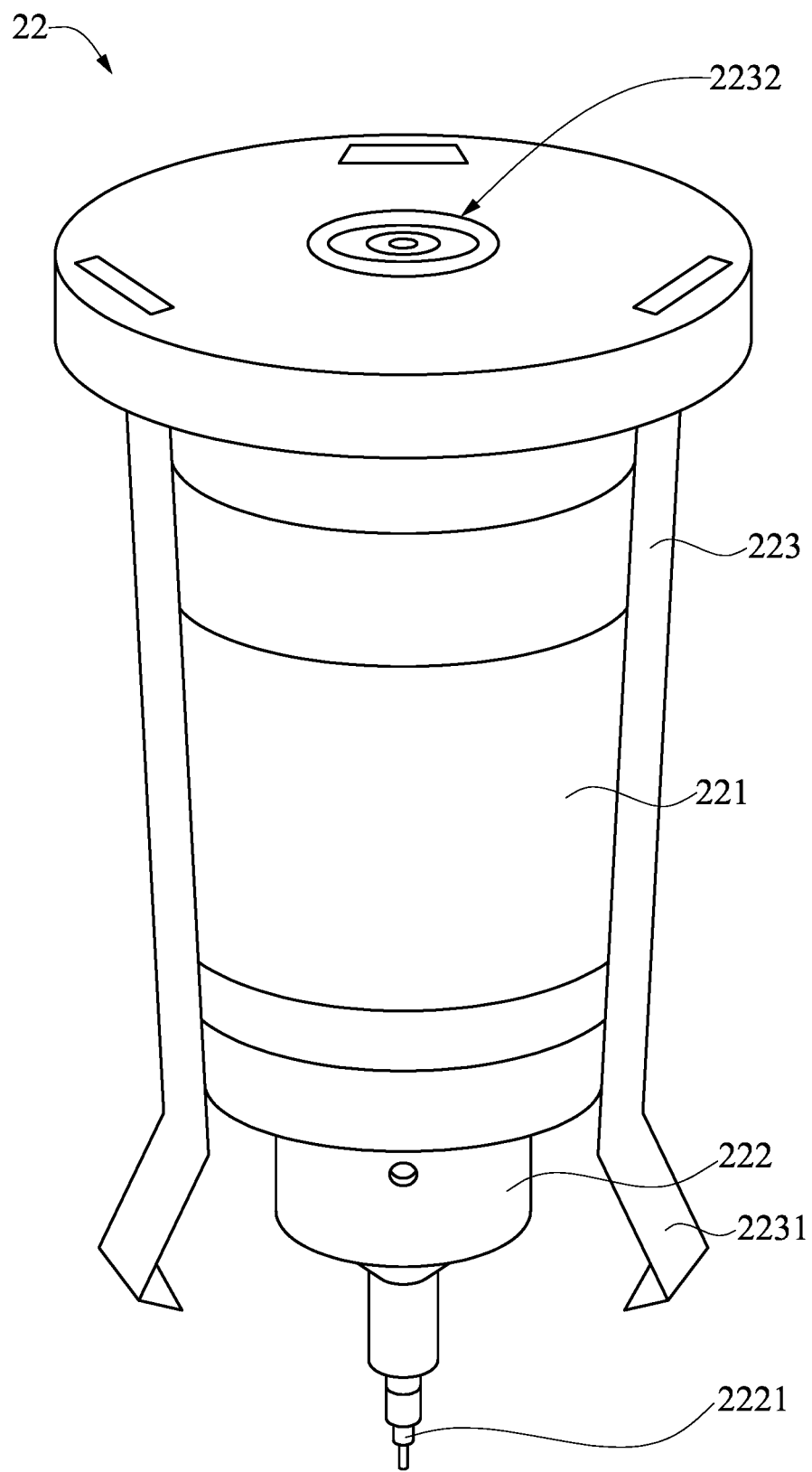
FIG. 2 is a schematic view of a field calibration device of the calibration system according to the present disclosure.
Figure 3:
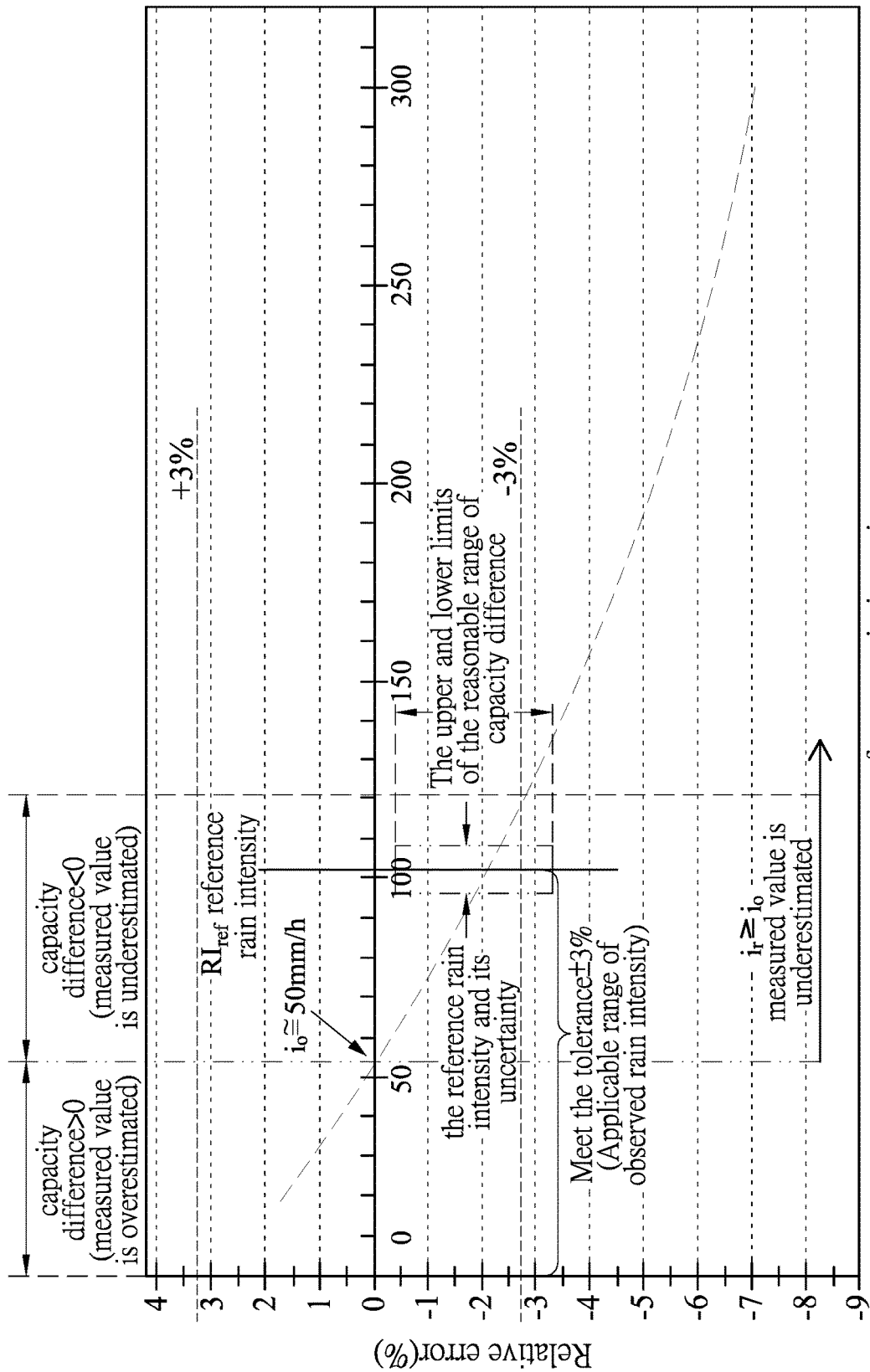
FIG. 3 is a schematic diagram showing a relationship (trend) between a capacity difference measured by the tipping bucket rain gauge and simulated rainfall intensities.

Referring to FIG. 1 to FIG. 3, FIG. 1 is a schematic view of a calibration system according to the present disclosure and a typical tipping bucket rain gauge, FIG. 2 is a schematic view of a field calibration device (i.e., FCD) of the calibration system according to the present disclosure, and FIG. 3 is a schematic diagram showing a relationship (trend) between a capacity difference measured by the tipping bucket rain gauge and simulated rainfall intensities.

A tipping bucket rain gauge 100 is one type of a flow meter that measures an accumulated depth of rainfall in millimeters (i.e., a depth of rainfall per unit area on a horizontal surface). The tipping bucket rain gauge 100 is measured by a similar measuring cup (i.e., a bucket 14) that can hold a nominal volume $V_N$. The nominal volume $V_N$ refers to a capacity of the bucket 14 of the tipping bucket rain gauge 100 to hold a certain amount of rainfall with a resolution of R (i.e., rainfall depth). Therefore, $V_N=R \times A$, where A represents an area of a collection funnel 11 that is used to capture the rainfall. Taking a collection funnel with a diameter of 200 mm as an example, an area A=314.1596 mm² for collecting rainwater. When the tipping bucket rain gauge 100 is exemplified as taking a resolution of 0.5 mm and 1.0 mm, the nominal volumes are 157.08 ml and 314.16 ml, respectively. In other words, when the bucket 14 is filled with the nominal volume of rainwater and automatically tips over, the rainfall is equivalent to 0.5 mm or 1.0 mm as measured by the rain gauge (the number of the resolution R is 1). A measuring mechanism of the tipping bucket rain gauge 100 is to utilize two buckets 14 that have calibrated capacities and are located on both sides of a bearing 15 for alternately capturing rainfall by a seesaw-like motion (e.g., one of the two buckets 14 on the rising side is used to hold water, and another one of the two buckets 14 on the other side is tipped over to pour water), so as to achieve the purpose of continuous rainfall measurement.

The operation of the tipping bucket rain gauge 100 is as follows. After the rainwater is collected by the collection funnel 11, the rainwater flows through a catchment funnel 12 at the bottom of the collection funnel 11, and then into a buffering funnel 13 below. From the buffering funnel 13, the rainwater is directed into one of the buckets 14 located below. When another one of the two buckets 14 on one of two sides is filled with nominal volume rainwater, the bucket 14 on one of the two sides automatically tips over and empties the water due to the torque generated by its weight. Simultaneously, one of the two buckets 14 on another one of the two sides will rise and automatically take over to collect the rainwater that falls from the buffering funnel 13. When the tipping bucket rain gauge 100 is connected to a rain pack with built-in power supply (not shown), a hidden reed switch (not shown) is tripped every time the bucket 14 tips over, so as to send an analog message to the rain pack. Therefore, by accumulating the number of received messages (that is, the number of times that the buckets 14 tip over), the rain pack can measure a rainfall total $R_1$ according to the resolution R of the buckets 14. It is worth mentioning that not all tipping bucket rain gauges 100 include the buffering funnel 13. In different embodiments (such as European and American brands), the rainwater directly flows from the catchment funnel 12 at the bottom of the collection funnel 11 to the buckets 14 below, but the absence of the buffering funnel 13 does not affect the operation of the above metering mechanism.

Since the tipping bucket rain gauge 100 is one of the meteorological observation instruments regulated by the meteorological law, the capacity difference (i.e., the measurement error) of the tipping bucket rain gauge 100 should meet the requirements of the tolerance (i.e., an allowable error) in domestic regulations. The capacity difference RE (i.e., the measurement error) of the rain gauge is typically expressed as a relative error percentage, and is calculated using a formula of $RE=((RI_M-RI_{REF})/RI_{REF}) \times 100\%$, where $RI_M$ represents a measured rainfall intensity and $RI_{REF}$ represents a reference rainfall intensity. Currently, the meteorological law only stipulates that the tolerance of the rain gauge is ±3%. That is, the capacity difference should be within a range of ±3% (or −3%≤RE≤3%). However, the above-mentioned specifications are not complete since the characteristics of the capacity difference of rainfall observation instruments have not been grasped at the time of establishing the regulations. Hence, a further clarification is needed to meet practical needs.

All types of the tipping bucket rain gauge 100 have an obvious and unavoidable systematic error in their metering mechanisms. When the buckets 14 have carried the rainwater of the nominal volume and start to tip over, the rainwater continues to enter the buckets 14 from the buffering funnel 13, so that the buckets 14 accumulate an excessive amount of water (beyond the nominal volume) with each tipping, and this causes the systematic error.

Assuming $W_0$ is a water volume required to trigger the tipping of the buckets 14 (i.e., the nominal volume), the buckets 14 may be filled with a volume of water (denoted as $W_0$) and start tipping, but the rainwater continues to enter the buckets 14 (this phenomenon represents the unavoidable systematic error in the measurement mechanism of the tipping bucket rain gauge 100). When the buckets 14 tip over, an actual amount of water W contained in the buckets 14 will be more than expected (i.e., $W=W_0+\Delta W$ (Equation 1)). Here, $\Delta W$ represents an amount of water that continues to enter the buckets 14 during the tipping process (this is the systematic error in the measurement mechanism), and the measurement error $\Delta W$ is clearly related to the rainfall intensity experienced by the tipping bucket rain gauge 100 at the time. Assuming I represents the rainfall intensity at the time and $\Delta T$ represents a time period during which the rainwater continues to enter into one of the two buckets 14 until another one the two buckets 14 completely takes over, $\Delta W = I \times \Delta T$ (Equation 2). Based on this, it can be inferred that the capacity difference of the tipping bucket rain gauge will vary with the observed rainfall intensity.

Due to the meteorological regulations specifying a tolerance of ±3% for rainfall gauges, efforts are made to maximize the range of rainfall intensities for which the capacity difference of the tipping bucket rain gauge (i.e., the tipping bucket rain gauge 100) falls within the acceptable tolerance. During the design and manufacturing of rainfall gauges, it is necessary to select a specific rainfall intensity $I=I_0$ within an intended range of the observed rainfall intensities. When the rainfall gauge is exposed to the specific rainfall intensity and the bucket 14 tips over, the actual water volume W collected by the bucket 14 is exactly equal to its nominal volume $W_0$ (the capacity difference RE is close to zero at this time). From Equation 1 and Equation 2, $W=W_0=W+I_0\times\Delta T$ (Equation 3) can be obtained. Since the rainfall intensity $I=I_0>0$ satisfies the requirement of Equation 3, W is less than $W_0$. In other words, when designing and manufacturing the tipping bucket rain gauge 100, it is necessary to find a simulated water volume W that is smaller than the nominal volume $W_0$ and can trigger the tipping action of the buckets 14.

According to the design of the tipping bucket rain gauge described above, when the rain gauge is exposed to a rainfall intensity $I_R$ that is smaller than a predetermined rainfall intensity $I_0$, the filled water volume W of the bucket 14 during tipping will be smaller than the nominal volume $W_0$ (since $\Delta W=(I_R-I_0)\times\Delta T<0$), and the capacity difference will be a positive value (i.e., 0<RE<3). However, when the rain gauge is exposed to the rainfall intensity $I_R$ that is greater than or equal to the predetermined rainfall intensity $I_0$ (i.e., $I_R\geq I_0$), the filled water volume W of the bucket 14 during tipping will be larger than the nominal volume (i.e., $\Delta W>0$), and the capacity difference will be a negative value (i.e., $-3<RE<0$). Therefore, as the observed (or measured) rainfall intensity changes from low ($<I_0$) to high ($>I_0$), the capacity difference of the tipping bucket rain gauge 100 also changes from a positive value to a negative value (i.e., the measured values change from overestimation to underestimation). A trend of the capacity difference changing with the rain intensity is roughly shown in FIG. 3.

The tipping bucket rain gauge 100 is a meter that is designed and manufactured with precision. When the bucket 14 of the tipping bucket rain gauge 100 is filled with the rainwater of the nominal volume (that is, 1 resolution R (rainfall depth)), the tipping bucket rain gauge 100 can automatically tip the water with the torque generated by its own weight without consuming electricity, and continuously measure the rainfall. Therefore, the tipping bucket rain gauge 100 is highly suitable for long-term field rainfall observation tasks. The measuring mechanism of the tipping bucket rain gauge involves the bearing 15 at a center to connect and support two buckets (tipping devices) on the left and right sides. The setup resembles a seesaw, thereby allowing the buckets to alternate between upward and downward movements for completion of the measurement process. However, similar to other measuring instruments, the mechanical bearing device of the tipping bucket rain gauge may experience changes in the measurement error (i.e., the aforementioned nominal volume $V_N$) due to bearing wear or environmental factors. Therefore, the tipping bucket rain gauge requires regular calibration to maintain the accuracy of its measurements. The adjustment of the capacity difference is achieved by modifying a height of a stop screw 16 located beneath the buckets, so as to adjust the water holding capacity of the buckets (and the torque required for the tipping action of the buckets).

The purpose of calibrating the rain gauge is to ensure the accuracy of the measurements obtained therefrom, so that the capacity difference of the instrument can meet the tolerance requirements. However, the calibration of the rain gauge (i.e., the capacity difference testing and adjustment) has faced limitations due to the limited capacity of laboratory calibration. In the past, the rain gauge could only be sent for calibration periodically based on calibration cycles (or regulatory requirements). Such a method frequently results in the dilemma where faulty rain gauges cannot be detected in a timely manner. The rain gauge calibration laboratory is required to comply with the standards set by accreditation bodies (i.e., Taiwan Accreditation Foundation) and the international standard ISO 17025 (general requirements for the competence of testing and calibration laboratories). The calibration of the rain gauge must completely follow the requirements of the standard operating procedure (e.g., calibrating 7 groups of rain intensities evenly distributed in the rain intensity range), which may incur high labor costs and need long calibration time.

However, when it comes to the requirements of capacity difference testing and instrument functionality check for the rain gauges, the required results may be obtained without necessarily going through the entire standard laboratory calibration process. In addition, the functionality of the calibration laboratory includes not only testing whether or not the capacity difference of the instruments meets the tolerance requirements but also adjusting the rain gauges that do not meet the tolerance requirements for the capacity difference.

The calibration laboratory aims to align trend lines of the capacity difference of the tipping bucket rain gauges 100 (whether from the same or different manufacturers) with varying rainfall intensities. On this basis, each of the tipping bucket rain gauge 100 (whether from the same or different manufacturers) can measure the rainfall consistently within its applicable observation range (where the capacity difference meets the tolerance requirement of ±3%) and within a reasonable observation time interval. Since the specific environmental conditions to which the requirement of the observed rainfall intensity range (where the capacity difference meets the tolerance requirement of ±3%) applies are not explicitly specified in the regulations, confusion may occur. As mentioned in paragraph [0026], at the time of establishing the regulations, there might not have been a thorough understanding of the characteristics of the capacity difference of the instruments and the practical requirements for rainfall observation. Consequently, the incomplete aspect of the regulations necessitates further clarification and refinement to address the issue.

From the perspective of practical requirements in rainfall observation, measurement values of the rain gauge should possess accuracy and reliability, and performance of the rain gauge should meet the specific needs and objectives of an observer. In other words, the capacity difference of the rain gauge within its applicable range of rainfall intensity should meet the tolerance requirements specified in the regulations, and the range of rainfall intensity suitable for observation made by the rain gauge should fulfill the specific needs and objectives of the observer. In order to meet the observation needs of different rainfall characteristics, the tipping bucket rain gauge provides different resolutions (resolution) for selection. In principle, the rain gauge with a smaller resolution (e.g., 0.1 mm or 0.2 mm) or a larger resolution (e.g., 0.5 mm or 1.0 mm) should be used to observe light rain or heavy rain, respectively. The different resolutions have their respective applicable ranges for observing the rainfall intensity. The users can choose the tipping bucket rain gauge with different resolutions (or granularity) based on the rainfall characteristics of an observation area, so that the applicable range of observed rain intensity may meet the requirements for observation purposes. In theory, the range of rainfall intensity observed by the rain gauge should include maximum rainfall intensities that are commonly observed, have occurred in the past, or are anticipated to occur in the future. Taking Taiwan for example, although rainfall events with hourly precipitation exceeding 100 mm (or even higher) are occasionally heard of, but such instances are not common. Due to the current limitations of the calibration equipment in the calibration laboratory of the governing authority (i.e., Central Weather Bureau) in Taiwan, a maximum calibration rainfall intensity that can be provided is 100 mm/H (or 120 mm/H). Therefore, in Taiwan, the current range of rainfall intensities in which the capacity difference of the rain gauges should meet the tolerance requirements is from 10 mm/H (or 20 mm/H) to 100 mm/H (or 120 mm/H). That is to say, the rain gauge is at least within the applicable range of observed rain intensity.

Furthermore, the applicable range of rainfall intensities for the tipping bucket rain gauge depends on its resolution. When observing light rainfall or heavy rainfall, rain gauges with smaller resolutions (e.g., 0.1 mm or 0.2 mm) or larger resolutions (e.g., 0.5 mm or 1.0 mm) should be used, respectively. The aforementioned two ranges of rainfall intensities are applicable to rain gauges with resolutions of 0.5 mm and 1.0 mm, respectively. The rain gauges with a resolution of 0.1 mm or 0.2 mm are suitable for observing rainfall intensities in the range from 10 mm/H to 30 mm/H (or 40 mm/H). Therefore, under the current regulatory standards, rainfall intensities of 100 mm/H (or 120 mm/H) can be considered as the maximum range for the rain gauges that are intended for general disaster prevention purposes, where the capacity difference should meet the tolerance requirements.

Reference is made to FIG. 3, in which a trend relationship between the capacity difference (i.e., a relative error) of the tipping bucket rain gauge 100 and the varying simulated (or observed) rainfall intensities is depicted by a long broken line in the schematic diagram. In FIG. 3, the capacity difference of the tipping bucket rain gauge 100 falls within the acceptable tolerance of ±3% (indicated by a horizontal dotted line) for the rainfall intensity range of from 20 mm/H≤RI≤120 mm/H (i.e., the rain gauge is suitable for observation). Here, 120 mm/H represents the maximum rainfall intensity for which the rain gauge is suitable for observation (as indicated by a vertical dotted line in FIG. 3). In other words, if the observed rainfall intensity is below 120 mm/H, the capacity difference of the rain gauge will always meet the tolerance requirements.

Taking the tipping bucket rain gauge with a high resolution of R=1.0 mm for example, 120 mm/H is also the maximum rainfall intensity for which its capacity difference should at least meet the tolerance requirements. Taking the tipping bucket rain gauge with a resolution of R=0.5 mm for example, the maximum rainfall intensity for which its capacity difference should at least meet the tolerance requirements is 100 mm/H. Therefore, when verifying the performance of the rain gauge, if the characteristic of the capacity difference of the tipping bucket rain gauge varying with the rainfall intensity can be utilized, selection of a "critical rainfall intensity" slightly below 120 mm/H (which is the maximum rainfall intensity applicable for the rain gauge) alone allows the purpose of testing whether or not the measured capacity difference of the gauge meets the tolerance requirements to be achieved. When the capacity difference of the rain gauge at the "critical rainfall intensity" falls below −3% (e.g., an absolute value of the capacity difference exceeds 3%), the measured capacity difference of the gauge no longer meets the tolerance requirements. If the capacity difference value is greater than −3% (e.g., the absolute value of the capacity difference is less than 3%), the capacity difference at the "critical rainfall intensity" can meet the tolerance requirements. However, it is necessary to further examine whether or not the value falls within an anticipated or hypothetical reasonable range. If the value is confirmed to fall within a reasonable range, the rain gauge as described in paragraph [0034] is capable of meeting the tolerance requirements for the capacity difference within the applicable observed or monitored rainfall intensity range. If the capacity difference value exceeds the reasonable range, it indicates that not all of the capacity differences within the applicable observed or monitored rainfall intensity range can meet the tolerance requirements. In such cases, adjustments would be necessary.

A virtual range used to determine an acceptance standard for the capacity difference is based on the following factors: (1) the general trend of the capacity difference varying with the simulated or endured rainfall intensity, which is used to assess whether or not other capacity differences below the "critical rainfall intensity" also meet the tolerance requirement of ±3%; (2) the "critical rainfall intensity" (which refers to the rainfall intensity that is stimulated by the field calibration device (FCD) of the calibration system); and (3) considerations such as the "uncertainty" of the reference rainfall intensity (a lower limit of allowable variability in measured values) and the "acceptance standard" of the capacity difference (upper and lower limits of acceptable errors). The explanation is as follows.

In continuation of the above, the following description describes an implementation example of the tipping bucket rain gauge 100 with a resolution of 0.5 mm (with a minimum capability of measuring the rainfall intensity up to 100 mm/h). The diagram in FIG. 3 illustrates the relationship between the capacity difference and the variation in the rainfall intensity, and is explained as follows: (1) a simulated rain intensity of approximately 100 mm/H (i.e., the reference rain intensity) is selected in the present embodiment; (2) the actual simulated rainfall intensity and a range thereof (i.e., the reference rain intensity and its uncertainty) generally fall on either side of a vertical solid line indicating the reference rainfall intensity (as shown within a dotted box in the figure), in which the uncertainty of the reference rainfall intensity and its range is determined by conducting repeated tests on an FCD water supply flow rate using different times and a total of 30 test operators, and statistical measures (such as a standard deviation σ or a coefficient of variation CV) that are commonly used in a statistical quality control are employed to assess the stability of the flow rate and calculate its uncertainty; and (3) the reasonable range for the virtual (or default) capacity difference value is depicted within the dotted box shown in the diagram. The dotted box has the simulated rainfall intensity (i.e., the reference rain intensity $RI_{REF}$) at its center, and is formed by vertical broken lines on the left and right sides (i.e., simulating the range of possible changes in the rain intensity by taking the uncertainty into consideration), as well as upper and lower horizontal broken lines (i.e., the upper and lower limits of the reasonable range of capacity difference after taking the uncertainty into consideration). The dotted box serves as the virtual range, and can be used as the acceptance standard for testing the capacity difference value.

In order to verify the capacity difference, the concept of measurement uncertainty is adopted. Specifically, a series of repeated tests are conducted on the FCD in the laboratory under different time intervals, environmental conditions, and variations in human operation. The process helps calibrate the reference rainfall intensity (i.e., the flow rate) of the FCD and determine its uncertainty. The reasonable range for verifying the capacity difference of the verification component (i.e., accommodating the uncertainty in the reference rainfall intensity of the FCD) is estimated to ensure compliance with the tolerance requirements within the upper and lower limits. Therefore, by utilizing the reference rainfall intensity and the uncertainty of the FCD, the capacity difference (i.e., the measurement error) of the verification component can be calculated. A simple conformity assessment (i.e., a compliance statement) can be performed by comparing the calculated capacity difference with the preset acceptance standard (i.e., the tolerance), so as to determine whether or not it falls within acceptable limits. Accordingly, the FCD not only improves the accuracy and reliability of the checking results, but also better meets the checking purpose of the user.

In the present embodiment, when the verification component is subjected to a reference rainfall intensity of approximately 100 mm/h, the capacity difference should be greater than or equal to −3%. Taking into account the potential uncertainties in both the reference rainfall intensity and the capacity difference during the verification process, the reasonable capacity difference (including the acceptance standard) of the simulated rainfall intensity should fall within a range from −1.0% to −3.5%. Accordingly, an application can swiftly calculate the capacity difference of the tipping bucket rain gauge 100 to be tested. The previously determined capacity difference value can then be used to assess whether or not the measured capacity difference of the verification object meets the qualification criteria (or satisfies the tolerance requirements). Furthermore, based on the relevant measurement data obtained from conducting a set of verification tests (e.g., the two buckets are filled to the nominal volume for 20 times, which indicates 10 tip-overs for each of the left and right buckets), the condition of the tipping bucket rain gauge 100 can be determined.

In practical application, a field calibration device 22 of a calibration system 200 in the present disclosure is considered as a "standard component for calibration" in the field of calibration. Its simulated rainfall intensity (which is referred to as the "reference rainfall intensity") is calculated based on the flow rate of the water supply from the field calibration device 22. Therefore, it is necessary to first calibrate the field calibration device 22 in a laboratory with traceable measurement standards and calculate the uncertainty of the reference rainfall intensity. In one application example, the reference rainfall intensity for each field calibration device 22 needs to be pre-calibrated in the calibration laboratory capable of conducting measurements with traceable standards. Following documented standard operating procedures, multiple measurements by different operators are conducted to ensure repeatability, so that the measurements are carried out to calibrate the flow rate of the field calibration device 22, and the uncertainty is calculated based on the standard deviation of the measured flow rate values from each calibration test.

The calibration system 200 of the present disclosure includes an application (APP) 21, the field calibration device (FCD) 22, and a detection communication box 23. The application 21 can be executed by an electronic device A. The electronic device A can be anything that has simple computing and communication functions and is easy to carry, such as smart phones, tablets, and laptops, but the present disclosure is not limited thereto. The electronic device A can pre-load a detection object (e.g., the tipping bucket rain gauge 100) in the application 21, such as a brand, a model, a serial number, a resolution, a collection funnel caliber, and other related parameters. When the electronic device A receives environmental information 2311 (i.e., a temperature, a humidity, or an atmospheric pressure) and metering information 23211 transmitted by the detection communication box 23, the application 21 can immediately calculate the capacity difference measured by the tipping bucket rain gauge 100 according to the model and specification of the detection object (i.e., the tipping bucket rain gauge 100) and the flow rate (i.e., the reference rainfall intensity) corresponding to the field calibration device 22. Moreover, the application 21 determines the usability of the verification object based on preset conditions and generates a suggestion message for the user to follow or refer to.

The field calibration device 22 can provide a highly stable flow rate (a single constant flow rate) of water supply, so as to simulate the specific rain intensity that the rain gauge can withstand and also serve as the "standard component for calibration" in this test. The field calibration device 22 includes a water bottle 221, a constant head adaptor (CHA) 222, and a placement frame 223. The water bottle 221 is used to hold the water required for simulating rainfall (e.g., clean water, such as packaged water readily available from convenience stores, without the need for elaborate preparation). In practical applications, the water bottle 221 can be a commonly available sampling bottle with easy accessibility. For example, the water bottle 221 can have a diameter of 40 mm (i.e., a medium mouth) and a capacity of 1000 ml, and be made of polyethylene (PE) material. However, the material, the diameter, and the capacity of the water bottle 221 are not limited to the examples mentioned above.

The constant head adaptor 222 is designed based on the fundamental principles of fluid mechanics, such as achieving a balance between the atmospheric pressure and a water column height inside a sealed bottle. The constant head adaptor 222 utilizes a small vent hole to limit the variation of a water head inside an atmospheric chamber of the constant head adaptor to a very small range (approximately a range from 2 mm to 5 mm), thereby controlling an outflow rate of the water from the sealed water bottle 221 in the field calibration device 22. One end of the constant head adapter 222 is fixed on an open end of the water bottle 221. A needle 2221 that is replaceable is disposed at an outlet end of the constant head adapter 222, and serves as a titration nozzle. In practical application, the titration nozzle can adopt an industrial standard No. 16 needle. An inner diameter of the No. 16 needle is 1.233 mm, a needle length of the No. 16 needle is 6 mm, and the material of the No. 16 needle is brass (e.g., cobalt tin alloy). However, the number, length, material, etc. of the needle 2221 are not limited thereto. In practical applications, different lengths and gauge numbers of the needle in accordance with industrial standards can affect the flow rate of the water supplied by the field calibration device 22. Nevertheless, the water supply flow rate of the field calibration device 22 must be calibrated in advance in the laboratory capable of conducting measurements with traceable standards, so as to meet the requirements of the "standard component for calibration" (reference can be made to the description in the preceding paragraph [0042]).

The water bottle 221 with the constant head adapter 222 is inverted inside the collection funnel 11 of the tipping bucket rain gauge 100 being tested by the placement frame 223. When the water bottle 221 is filled with the water, and the water bottle 221 and the constant head adaptor 222 are inverted inside the collection funnel 111 by the placement frame 223, resulting in the water contained in the water bottle 221 is configured to flow through the constant head adaptor 222 at a predetermined flow rate via the needle 2221 and enter the collection funnel 111 of the tipping bucket rain gauge 100, so as to simulate the tipping bucket rain gauge 100 under the conditions of experiencing the predefined intensity of rainfall.

The placement frame 223 includes three legs 2231, and a bottom portion of each of the three legs 2231 is bent inward at a 45-degree angle, so as to stand firmly in the collection funnel 11. A spirit level 2232 is also disposed on the placement frame 223. When the water bottle 221 is filled with water and the constant head adapter 222 is fixed on the outlet end, the placement frame 223 and the spirit level 2232 can quickly adjust a level of the constant head adapter 222, so that the water bottle 221 can be safely placed in the collection funnel 11 of the tipping bucket rain gauge 100. A constant flow rate of water provided by the constant head adapter 222 can be used to simulate specific rainfall intensities that the tipping bucket rain gauge 100 can withstand. In practical applications, the operator can adjust the position and the level of the field calibration device 22 by viewing the spirit level 2232, so as to ensure that the field calibration device 22, the body of the water bottle 221, and the needle 2221 are kept perpendicular to the ground. In this way, the water flow rate of the field calibration device 22 is less affected by a placement position or improper user handling of the field calibration device 22.

It is also worth mentioning that if the water inside the water bottle 221 contains impurities or excessive air bubbles, the flow rate of the water supplied by the field calibration device 22 may be affected. Therefore, during actual operations, it is preferable to directly use bottled water sold in the convenience stores for the water bottle 221. The bottle can be tilted when having water poured therein, so that the water can slowly enter along a wall of the bottle to reduce water splashing and entrainment of air. Accordingly, a water output can avoid being affected by air bubbles generated in the water.

In practical applications, since the field calibration device 22 serves as the "standard component for calibration," the flow rate of the water supplied by the field calibration device 22 should be calibrated in the calibration laboratory that can perform traceable measurements (reference can be made to the description in paragraph [0042]). Since the production of each of the field calibration devices 22 has its uniqueness, the flow rate (that is, the reference rain intensity) of each of the field calibration devices 22 must be calibrated separately with the uncertainty calculated. The relevant calibration information will be uploaded to a cloud monitoring system database established by a management unit for recording and annotating with a calibration date. Additionally, the relevant calibration information will be loaded into the application 21 of the calibration system described in the present disclosure and locked (preventing further changes), and be used to calculate the capacity difference of the verification component. The detection results of the capacity difference of the rain gauge can also be reversely uploaded to the aforementioned cloud monitoring system database, and provided to a competent authority of the rain gauge to establish an automatic management mechanism for checking.

The detection communication box 23 includes an environmental condition sensor 231, a measurement sensor module 232, a message transmission module 233, and a power supply module 234. An operational procedure is as follows. (1) The environmental condition sensor 231 is used to sense at least one type of the environmental information 2311, such as the temperature, the humidity, or the atmospheric pressure, in the surrounding environment. The information is required to fulfill the testing specification for presenting the "environmental conditions" during the testing and to facilitate the calculation of "uncertainty." (2) The message transmission module 233 transmits the environmental information 2311 (including the temperature, the humidity, and the atmospheric pressure) from the environmental condition sensor 231 to the electronic device A running the application 21. The application 21 can utilize the information to adjust the corresponding settings. For example, different temperatures can alter the density and viscosity of water, so as to affect the actual water supply flow rate of the constant head adapter 222 of the field calibration device 22 (i.e., the reference rain intensity).

The measurement sensor module 232 includes a metering sensor 2321. When the measurement sensor module 232 detects an automatic tipping action of the buckets 14 of the tipping bucket rain gauge 100 that is filled with water up to the nominal volume, the measurement sensor module 232 is configured to correspondingly generate the metering information 23211. The measurement sensor module 232 can adapt to local conditions and use various types of simple, stable, reliable, and cost-effective sensors, which include acoustic sensors (e.g., sound and vibration sensors), optical sensors (e.g., optical fibers), and electrical sensors (e.g., magnetic reed switches), to detect the tipping motion of the bucket 14, so as to generate the metering information 23211. After the measurement sensor module 232 generates the metering information 23211, the message transmission module 233 will transmit the metering information 23211 to the electronic device A executing the application 21, so that the application 21 generates corresponding actions. In one of the embodiments, the measurement sensor module 232 can use the vibration sensor to detect the vibrations generated when the bucket is filled with the water up to the nominal volume and automatically tips over, so as to generate the metering information 23211.

When the electronic device A receives the metering information 23211 from the measurement sensor module 232, the application 21 calls a timer of the electronic device A, and calculates the time required for each tipping event of the left and right buckets 14 (that are filled with the water up to the nominal volume). The application 21 calculates the actual volume of water collected during each tipping event of the left and right buckets 14 based on the flow rate of the constant head adaptor 222, so as to calculate the average and standard deviation of the collected water volume for the left and right buckets 14.

The application 21 uses the time required to complete a set of detection tests (e.g., the two buckets are filled to the nominal volume for 20 times, which indicates 10 tip-overs for each of the left and right buckets) for calculating an instrumental rainfall intensity of the tipping bucket rain gauge 100. The application 21 further uses the reference rain intensity corresponding to the field calibration device 22 to calculate the capacity difference measured by the checking object. Finally, the application 21 can use the relevant information measured during the detection process to determine the applicability of the inspection object according to the preset conditions, and generate the suggestion message. The suggestion message provides suggestions on the subsequent use and processing of the verification component, which can be used and referred to by the users.

The metering information 23211 can, for example, include a pulse analog signal. The tipping motion of the buckets is a clearly distinguishable action. Therefore, simple sensors can be used to detect the tipping motion of the buckets, such as acoustic (e.g., sound, or vibration), optical (e.g., optical fiber), electrical (e.g., magnetic reed switch), or any other sensor capable of detecting the tipping motion. The sensors can be used to trigger corresponding actions within the application based on the detected tipping motion (although the detected tipping motion is not directly used for measurement purposes).

The message transmission module 233 of the detection communication box 23 can transmit the received environmental information 2311 and metering information 23211 to the electronic device A through wireless means (e.g., WI-FI® or BLUETOOTH®) or wired connections. The communication methods can include various wireless transmission chips, such as BLUETOOTH® or WI-FI® chips, but the present disclosure is not limited thereto.

The power supply module 234 is electrically connected to the environmental condition sensor 231, the measurement sensor module 232, and the message transmission module 233. The power supply module 234 supplies power to each of the environmental condition sensor 231, the measurement sensor module 232, and the message transmission module 233. The power supply module 234 can be a storage battery, a rechargeable battery, or a mobile power supply.

After the electronic device A executing the application 21 receives the metering information 23211 and the environmental information 2311, the application 21 is configured to calculate a capacity difference 211 of the tipping bucket rain gauge 100 according to the metering information 23211, the environmental information 2311, the flow rate (i.e., the simulated rain intensity) corresponding to the field calibration device 22, and the nominal volume of each of the buckets 14 of the tipping bucket rain gauge 100. The application 21 is configured to determine whether or not the capacity difference 211 exceeds the acceptance standard, so as to correspondingly generate a suggestion message 212. The acceptance standard can be, for example, the tolerance requirement of the meteorological law, or a user-defined standard.

Specifically, the application 21 is configured to calculate a rainfall intensity $RI_m$ measured by the tipping bucket rain gauge 100 based on the flow rate ($RI_{ref}$) corresponding to the field calibration device 22, the timing of receiving each of the metering information 23211 by the application 21, and the nominal volume of each of the buckets 14 in the tipping bucket rain gauge 100. The application 21 is configured to use a following equation: $RE=(RI_m-RI_{ref})/RI_{ref} \times 100\%$ to calculate a relative capacity difference (RE) of the tipping bucket rain gauge 100.

In practical applications, the application 21 can connect to a remote server B through the telecommunication network of the electronic device A, and obtain relevant parameters of the tipping bucket rain gauge 100 to be detected (e.g., the brand, the model, the serial number, the resolution, and the collection funnel caliber).

Figure 4:
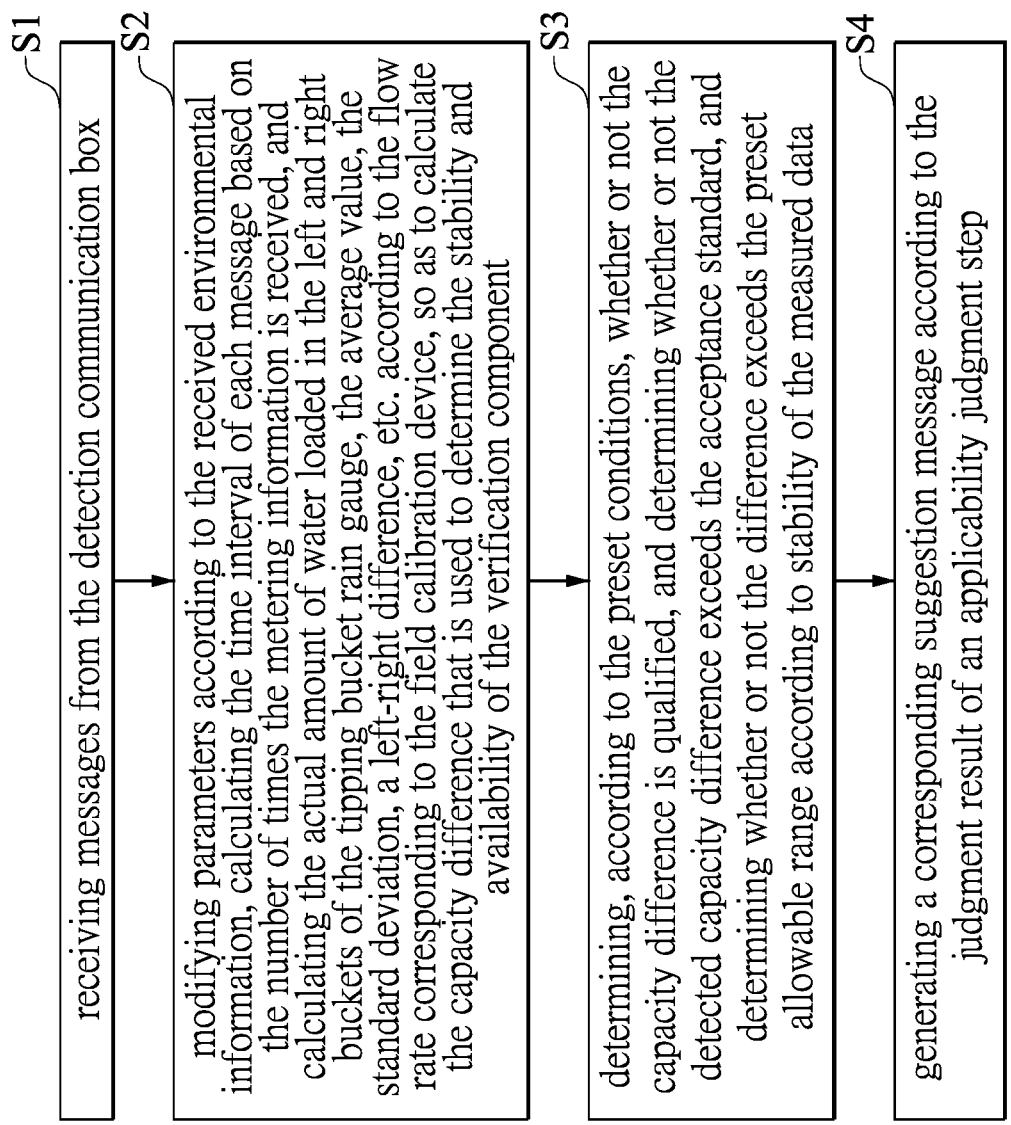
FIG. 4 is a flowchart of an application executing a check program according to the present disclosure.

Referring to FIG. 4, in practical applications, the application can execute a check program on a general portable or handheld electronic device (e.g., a mobile phone or a tablet). The check program includes steps S1 to S4.

A receiving step S1 is implemented by receiving messages (including the environmental information and the metering information) from the detection communication box.

A calculation step S2 is implemented by modifying parameters according to the received environmental information (e.g., the water density is corrected according to the temperature and the atmospheric pressure, or the flow rate is corrected according to the temperature and humidity pressure), calculating the time interval of each message based on the number of times the metering information is received, and calculating the actual amount of water loaded in the left and right buckets of the tipping bucket rain gauge, the average value, the standard deviation, a left-right difference, etc. according to the flow rate corresponding to the field calibration device, so as to calculate the capacity difference that is used to determine the stability and availability of the verification component.

A judgment step S3 is implemented by determining, according to the preset conditions (e.g., the acceptance standard), whether or not the capacity difference is qualified (i.e., meeting the tolerance requirements). The judgment step S3 is further implemented by determining whether or not the detected capacity difference exceeds the acceptance standard, and determining whether or not the difference exceeds the preset allowable range according to stability of the measured data.

A prompt step S4 is implemented by generating a corresponding suggestion message according to the judgment result of an applicability judgment step.

Based on the above, the calibration system of the present disclosure (including the field calibration device, the message communication box, and the application) allows personnel without professional calibration training or strict operational training to perform operations on-site for the tipping bucket rain gauge under verification. The calibration system can accurately detect the capacity difference of the tipping bucket rain gauge under verification in a short period of time at the on-site location. The calibration system can assess the suitability of the tipping bucket rain gauge and provide recommendations to the personnel regarding the subsequent handling of the tipping bucket rain gauge.

The calibration system of the present disclosure is characterized by its relatively low overall cost and lightweight design, and is thus convenient for the personnel to carry and use. The field calibration device needs to provide a highly repeatable and accurate flow rate in order to effectively simulate specific rainfall intensities. The flow rate of the field calibration device in the present disclosure is calibrated by using a traceable measurement standard in the calibration laboratory.

Therefore, the field calibration device can be considered as the standard component for calibration comparable to the traceable measurement standard in the laboratory. The field calibration device serves as a reference rainfall intensity (including uncertainty) for the field calibration device, and is used to calculate the capacity difference of the verification object. As such, the calibration system of the present disclosure can provide accurate measurement results and make reliable assessments of applicability.

The calibration requirement for the measurement of the capacity difference (i.e., measurement error) in the tipping bucket rain gauge is typically based on the calibration cycle, which is usually between 1 to 3 years. Additionally, if there are doubts or concerns about the measurement results, the entire rain gauge can be removed from a self-monitoring station and sent back to the calibration laboratory for calibration (if the capacity difference does not meet the tolerance requirements, necessary adjustments will be made and the calibration will be repeated until the capacity difference meets the tolerance requirements; otherwise, the rain gauge will be deemed non-compliant and discontinued). Currently, there is no effective method available to accurately test the accuracy of the tipping bucket rain gauge on-site. If the capacity difference of the rain gauge does not meet the tolerance requirements, the quality of water resource management and disaster prevention decisions made by the government are likely to be affected. The calibration system of the present disclosure provides a convenient tool for checking the tipping bucket rain gauge in real time. For example, by collecting relevant information on the measured values of the verification object, the calibration system utilizes professional judgment to assess the suitability of the verification object (including the stability of the rain gauge, variation in measured values, and the capacity difference under critical rainfall conditions), and provides recommendations for subsequent use or disposal (e.g. being qualified for use, requiring attention for follow-up use, sending to a factory for repair, or sending to the laboratory for calibration). The application in the electronic device can upload the relevant information of the verification results to a cloud-based database, thereby allowing the rain gauge management authority to actively manage and initiate repairs based on the information provided.

In conclusion, the calibration system of the present disclosure can provide a practical tool that is convenient, automated, and effective, which allows the user (e.g., a frontline rainfall observation personnel, a maintenance vendor, or a business administrator) to quickly assess the capacity difference of the tipping bucket rain gauge and verify the instrument usability at the field station, and to obtain subsequent handling recommendations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A calibration system, comprising:
   a field calibration device including:
      a water bottle configured to contain water necessary for simulating rainfall;
      a constant head adaptor installed at an open end of the water bottle, wherein a needle that is replaceable is disposed at an outlet end of the constant head adaptor; and
      a placement frame, wherein the placement frame is configured to allow the water bottle that is installed with the constant head adaptor to be invertedly disposed inside a collection funnel of a tipping bucket rain gauge to be tested;
      wherein, when the water bottle is filled with the water, and the water bottle and the constant head adaptor are invertedly disposed inside the collection funnel via the placement frame, the water contained in the water bottle is configured to flow out of the needle through the constant head adaptor at a predetermined flow rate and enter the collection funnel of the tipping bucket rain gauge, so as to simulate a condition where the tipping bucket rain gauge is exposed to the rainfall with a predetermined intensity;
   an application configured to be executed by an electronic device; and
   a detection communication box including:
      a measurement sensor module, wherein, when the measurement sensor module detects an automatic tipping action of a plurality of buckets of the tipping bucket rain gauge that are filled with the water up to a nominal volume, the measurement sensor module is configured to correspondingly generate metering information;
      an environmental condition sensor, wherein the environmental condition sensor is configured to sense at least one environmental parameter of a temperature, a humidity, and an atmospheric pressure of an environment where the detection communication box is located, and to correspondingly generate environmental information;
      a message transmission module configured to transmit the metering information and the environmental information to the electronic device that executes the application; and
      a power supply module electrically connected to the measurement sensor module, the environmental condition sensor, and the message information transmission module;
   wherein, after the electronic device that executes the application receives the metering information and the environmental information, the application is configured to calculate a capacity difference of the tipping bucket rain gauge according to the metering information, the environmental information, the predetermined flow rate, and the nominal volume of each of the buckets of the tipping bucket rain gauge; wherein the application is configured to determine whether or not the capacity difference exceeds an acceptance standard, so as to correspondingly generate a suggestion message.

2. The calibration system according to claim 1, wherein, after the electronic device that executes the application receives the metering information, the electronic device is configured to start a timer and calculate a time required for the buckets of the tipping bucket rain gauge to be filled with the water up to the nominal volume and tip over each time, and is configured to calculate an actual amount of the water contained in each of the buckets when tipping over based on the predetermined flow rate and the nominal volume.

3. The calibration system according to claim 1, wherein the environmental information includes the temperature, the humidity and the atmospheric pressure; wherein, after receiving the environmental information, the application corrects a density of the water according to the temperature and the atmospheric pressure in the environmental information, corrects the predetermined flow rate according to the humidity, and calculates an actual amount of the water contained in each of the buckets when tipping over.

4. The calibration system according to claim 1, wherein the measurement sensor module includes a vibration sensor, and the vibration sensor is configured to sense vibration of the tipping bucket rain gauge and generate the metering information.

5. The calibration system according to claim 1, wherein a spirit level is further disposed on the placement frame.

6. The calibration system according to claim 1, wherein the application is configured to calculate a rainfall intensity, defined as $RI_m$, measured by the tipping bucket rain gauge by:

calculating a time interval based on a time at which the application receives each piece of the metering information;

determining an actual volume of water collected during the time interval based on the predetermined flow rate, defined as $RI_{ref}$, corresponding to the field calibration device; and calculating the rainfall intensity based on the actual volume of water and the nominal volume of each of the buckets in the tipping bucket rain gauge;

wherein the application is configured to use an equation of $RE=(RI_m-RI_{ref})/RI_{ref}\times 100\%$ to calculate the capacity difference, defined as RE, of the tipping bucket rain gauge.

* * * * *